United States Patent
Sacks

(10) Patent No.: US 7,315,259 B2
(45) Date of Patent: Jan. 1, 2008

(54) TECHNIQUES FOR DISPLAYING AND CACHING TILED MAP DATA ON CONSTRAINED-RESOURCE SERVICES

(75) Inventor: Josh Sacks, San Carlos, CA (US)

(73) Assignee: Google Inc., Mountain View, CA (US)

( * ) Notice: Subject to any disclaimer, the term of this patent is extended or adjusted under 35 U.S.C. 154(b) by 113 days.

(21) Appl. No.: 11/202,454

(22) Filed: Aug. 11, 2005

(65) Prior Publication Data

US 2007/0080830 A1    Apr. 12, 2007

(51) Int. Cl.
*G08G 1/123*    (2006.01)
(52) U.S. Cl. .............................. 340/995.1; 340/995.14; 340/995.15; 701/208
(58) Field of Classification Search ............. 340/995.1, 340/995.12, 995.14, 995.15, 995.16, 995.17; 701/200, 201, 207, 208, 209, 211, 212
See application file for complete search history.

(56) References Cited

U.S. PATENT DOCUMENTS

| | | | |
|---|---|---|---|
| 5,559,707 A | 9/1996 | DeLorme et al. | |
| 5,613,051 A | 3/1997 | Iodice et al. | |
| 5,760,783 A | 6/1998 | Migdal et al. | |
| 5,802,492 A | 9/1998 | DeLorme et al. | |
| 6,054,990 A | 4/2000 | Tran | |
| 6,100,897 A | 8/2000 | Mayer et al. | |
| 6,111,583 A | 8/2000 | Yaron et al. | |
| 6,144,338 A | 11/2000 | Davies | |
| 6,202,026 B1 | 3/2001 | Nimura et al. | |
| 6,247,019 B1 | 6/2001 | Davies | |
| 6,262,741 B1 | 7/2001 | Davies | |
| 6,307,573 B1 | 10/2001 | Barros | |
| 6,321,158 B1 | 11/2001 | DeLorme et al. | |
| 6,346,938 B1 | 2/2002 | Chan et al. | |
| 6,388,684 B1 | 5/2002 | Iwamura et al. | |
| 6,473,691 B1 | 10/2002 | Winter et al. | |
| 6,496,189 B1 | 12/2002 | Yaron et al. | |
| 6,724,382 B2 | 4/2004 | Kenyon et al. | |
| 6,853,912 B2 * | 2/2005 | Han | 701/208 |
| 6,957,237 B1 * | 10/2005 | Traversat et al. | 707/206 |
| 6,960,997 B2 * | 11/2005 | Gieseke et al. | 340/995.1 |
| 7,088,266 B2 * | 8/2006 | Watanabe et al. | 340/995.1 |
| 7,124,022 B2 * | 10/2006 | Carmichael et al. | 701/208 |
| 7,173,546 B2 * | 2/2007 | Gomi et al. | 340/995.1 |

(Continued)

OTHER PUBLICATIONS

Crawford, Clayton, et al., Fast 3D Visualization of Large Image Datasets in a GIS, Earth Observation Magazine, vol. 12, No. 9, Dec. 2003, USA, pp. 1-5.

(Continued)

*Primary Examiner*—John Tweel, Jr.
(74) *Attorney, Agent, or Firm*—Fenwick & West LLP

(57) ABSTRACT

Techniques are disclosed that enable users to access and use digital mapping systems with constrained-resource services and/or mobile devices (e.g., cell phones and PDAs). In particular, latency of a mapping application on high-latency and low-throughput networks is minimized. One embodiment utilizes volatile and non-volatile storage of the mobile device to cache pre-computed map images (e.g., map tiles). An asynchronous cache can be used to prevent delays caused by potentially slow non-volatile storage. Meta-data about each map image and usage patterns can be stored and used by the cache to optimize hit rates.

26 Claims, 7 Drawing Sheets

U.S. PATENT DOCUMENTS

| | | | | |
|---|---|---|---|---|
| 7,197,393 | B2 * | 3/2007 | Kim | 701/208 |
| 2002/0067353 | A1 | 6/2002 | Kenyon et al. | |
| 2002/0067374 | A1 | 6/2002 | Kenyon | |
| 2002/0067379 | A1 | 6/2002 | Kenyon et al. | |

OTHER PUBLICATIONS

Dragan, Richard V., MSN Virtual Earth 1.0, MSN Virtual Earth 1.0 review by PC Magazine, Jul. 26, 2005, [online], [retrieved on Aug. 1, 2005]. Retrieved from the Internet <URL: http://www.pcmag.com/article2/0,1895,1840750,00.asp>, pp. 1-2.

Mapquest.Com Maps, Directions and More, [online], [retrieved on Aug. 1, 2005]. Retrieved from the Internet <URL: http://www.mapquest.com>.

Montalbano, Elizabeth, Microsoft Takes on Google with Virtual Earth, IDG News Service, Jul. 25, 2005, [online], [retrieved on Aug. 1, 2005]. Retrieved from the Internet <URL: http://www.infoworld.com/article/05/07/25/HNmsvirtualearth_1.html>.

MSN Maps & Directions, [online], [retrieved on Aug. 1, 2005]. Retrieved from the Internet <URL: http://maps.msn.com/(ogxuearj4ya5au55fogcdzbt)/Home.aspx>.

MSN Virtual Earth—Microsoft Internet Explorer, [online], [retrieved on Aug. 1, 2005]. Retrieved from the Internet <URL: http://virtualearth.msn.com<, pp. 1-3.

MSN Virtual Earth To Take On Google Earth, [online], [retrieved on Aug. 1, 2005]. Retrieved from the Internet <URL: http://blog.searchenginewatch.com/blog/050523-125208<, pp. 1-4.

MultiMap.com—Online Maps Everywhere, [online], [retrieved on Aug. 1, 2005]. Retrieved from the Internet <URL: http://multimaps.com<.

NASA World Wind, [online], [retrieved on Aug. 1, 2005]. Retrieved from the Internet <URL: http://worldwind.arc.nasa.gov/<, pp. 1-2.

TerraServer-USA, [online], [retrieved on Aug. 1, 2005]. Retrieved from the Internet <URL: http://terraserver.homeadvisor.msn.com/>.

Whereis.com—Search Australian Maps, [online], [retrieved on Aug. 1, 2005]. Retrieved from the Internet <URL: http://www.whereis.com/whereis/home.jsp>.

Yahoo! Maps, Driving Directions, and Traffic, [online], [retrieved on Aug. 1, 2005]. Retrieved from the Internet <URL: http://maps.yahoo.com>.

Cosman, M., "Global Terrain Texture: Lowering the Cost," Proceedings of the 1994 Image VII Conference, Tempe, Arizona: The Image Society, pp. 53-64.

"ESRI Video Clips, What is GIS?" Jul. 25, 2006, [online] [Retrieved on Jul. 25, 2006] Retrieved from the Internet<URL:http://gis.esri.com/esriclips/clip.cfm?ClipID=60>.

Gleicher, M. et al., "Through-the-Lens Camera Control," Computer Graphics, Proceedings SIGGRAPH '92, Jul. 1992, pp. 331-340, vol. 26, No. 2, [online] [Retrieved on Jul. 25, 2006] Retrieved from the Internet<URL: http://www.cs.wisc.edu/graphics/Papers/Gleicher/CMU/camera.pdf>.

Leclerc et al., "TerraVision: A Terrain Visulization System," SRI International, Menlo Park, California, Tech. Note No. 540, Apr. 22, 1994.

Ho, T. K., et al., "Word Recognition with Multi-Level Contextual Knowledge," Center for Document Analysis and Recognition, State University of New York at Buffalo, pp. 1-11, Buffalo, New York, Dec. 2006.

Rabinovich, B., et al., "Visualization of Large Terrains in Resource-Limited Computing Environments," Proceedings of the 8th IEEE Visualization '97 Conference, Oct. 19-24, 1997, pp. 95-102, Phoenix, Arizona.

* cited by examiner

US 7,315,259 B2

TECHNIQUES FOR DISPLAYING AND CACHING TILED MAP DATA ON CONSTRAINED-RESOURCE SERVICES

RELATED APPLICATIONS

This application is related to U.S. application Ser. No. 11/088,542, filed Mar. 23, 2005, titled "Generating and Serving Tiles in a Digital Mapping System," which claims the benefit of U.S. Provisional Application Nos. 60/650,840, filed Feb. 7, 2005, and 60/567,946, filed May 3, 2004, and 60/555,501, filed Mar. 23, 2004. In addition, this application is related to U.S. application Ser. No. 11/051,534, filed Feb. 5, 2005, titled "A Digital Mapping System", which claims the benefit of U.S. Provisional Application Nos. 60/567,946, filed May 3, 2004, and 60/555,501, filed Mar. 23, 2004. Each of these applications is herein incorporated in its entirety by reference.

FIELD OF THE INVENTION

The invention relates to digital mapping systems, and more particularly, to techniques for displaying and caching map data on constrained-resource services, such as cellular and satellite telephone services.

BACKGROUND OF THE INVENTION

Computerized mapping systems have been developed to search for, identify, and discover information about geographic locations. One form of such computerized mapping systems includes travel-planning Internet websites. With an excess of 50 million unique monthly users, such map sites are a very popular offering. Examples of such sites include AOL's MapQuest, Yahoo's Telcontar-based maps, and Microsoft's MapPoint.net suite. Such sites all work along the lines of a common model, as will now be described.

When a Web user asks for a new map view (e.g., by entering a postal address, or by clicking a navigation link next to a current map view), the user's Web browser sends to a Web server a request indicating the boundaries of the new map view. The Web server in turn extracts the corresponding vector-based map data from a database, and draws a bitmap image of the map. The server then converts the bitmap to an image format supported by the user's Web browser and returns the image, sometimes embedded in HTML, to the user's Web browser so that it can be displayed. Other map Web sites, such as Britain's MultiMaps or Australia's WhereIs utilize a raster-based map database instead. In these cases, it is not necessary to extract vectors and draw a map image. Rather, these functions are replaced by simply extracting the appropriate part of a larger, pre-rendered image.

Whether vector-based or raster-based, such existing map systems are typically engaged using computer systems having substantial memory capacity (e.g., hard disk and RAM), such as desk top and laptop computers. Currently, such computers generally have unconstrained resources (e.g., substantial processing power and memory combined with broadband network/Internet connections), for the purposes of efficiently engaging a digital mapping system. However, it is also desirable to engage such mapping systems from mobile devices, such as cell phones, satellite phones, and personal digital assistants (PDAs).

Currently, such devices typically do not have enough memory to store an entire atlas for one country or even one region. Even if they did possess such capabilities, it is unclear how such a large dataset would be downloaded to a memory, or if a user would wish to do so. Building a mapping application for a cell phone requires downloading map images on an as-needed basis. However, current mobile networks are both slow and suffer from high-latency (e.g., 500-1000 ms latency, 2-4 KB/s throughput). In addition, many wireless carriers (e.g., cellular services) require users to pay per byte. Thus, downloading map images to mobile devices is generally constrained, particularly with conventional mapping systems.

What is needed, therefore, are techniques that enable users to access and use digital mapping systems with constrained-resource services and/or devices.

SUMMARY OF THE INVENTION

One embodiment of the present invention is a method for providing a tile-based map on a mobile device that is communicatively coupled to a tile-based mapping system. The method includes determining which map tiles of the tile-based mapping system are required to draw a requested map. In response to a required map tile being stored in a heap cache of the mobile device, the method includes drawing that map tile for display on the mobile device. In response to a required map tile being stored in a flash cache of the mobile device, the method includes loading that map tile into the heap cache. In response to a required map tile not being stored in the flash cache or the heap cache, the method includes queuing the tile for download from a remote tile server of the tile-based mapping system. The mobile device can be, for example, a cell phone or a personal digital assistant or a combination of the two (e.g., Palm Treo). In response to a required map tile being stored in a flash cache of the mobile device, the method may further include drawing the map tile for display on the mobile device after it is loaded into the heap cache. In response to a required map tile not being stored in the flash cache or the heap cache, the method may further include generating a placeholder tile image for tile queue for download. In response to a required map tile not being stored in the flash cache or the heap cache, the method may further include drawing the map tile for display on the mobile device after it is downloaded. In one particular case, queued map tiles are requested for download asynchronously once all missing tiles have been identified. In another particular case, at least one missing tile is not downloaded based on heuristics indicating there is a high likelihood that need for the at least one missing tile is fleeting. Missing map tiles can be downloaded, for example, in a background thread that operates contemporaneously with accessing of the caches. While missing tiles are downloading, a temporary map tile image can be displayed for at least one of the missing tiles. In one such embodiment, the temporary image is a low-resolution map image derived from a lower-level zoom. The flash cache can be maintained, for example, by an asynchronous process that carries out both insertion and removal of map tiles from the flash cache. In one such embodiment, the process includes sorting map tiles in the heap cache based on respective scores, selecting a new block of N top score map tiles for writing to the flash cache, and in response to there being room in the flash cache for the new block, the method may include adding map tiles of the new block to the flash cache. In response to there being insufficient room in the flash cache for the new block, the method may further include identifying a lowest score block in the flash cache, and in response to the score of the identified block being worse than a score of the new block, the method may further include replacing the identified block with the new block in the flash cache. In response to the score of the identified block not being worse than the score of the new block, the method may further include maintaining the flash cache as is. The heap cache can be maintained by an asynchronous process, which includes detecting that the heap cache exceeds its maximum size, sorting the map tiles in the heap cache based on respective scores, and removing lowest score map tiles from the heap cache, until its size is under the maximum size. The method may further include calculating a score for each map tile stored in the caches based on at least one of last access time of tiles, tile zoom level, and user access pattern of tile. In one particular case, each map tile is about 64 pixels per side.

Another embodiment of the present invention is a method for providing a tile-based map on a mobile device (e.g., cell phone, PDA, GPS device) that is communicatively coupled to a tile-based mapping system. This embodiment includes determining which map tiles of the tile-based mapping system are required to draw a requested map. Each map tile has a size that reduces required data bytes per screen, as compared to other map tile sizes. In response to a required map tile being stored in a volatile cache of the mobile device, the method includes drawing that map tile for display on the mobile device. In response to a required map tile being stored in a non-volatile cache of the mobile device, the method includes loading that map tile into the volatile cache. In response to a required map tile not being stored in the mobile device, the method includes requesting the tile for download from the tile-based mapping system. The method may also include calculating a score for each map tile stored in the mobile device based on at least one of last access time of tile, tile zoom level, and user access pattern of tile, and maintaining stored map tiles based on the scores. The map tiles can each have a size, for example, in the range of 32 to 128 pixels per side (e.g., square or rectangular).

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Figure 1A:
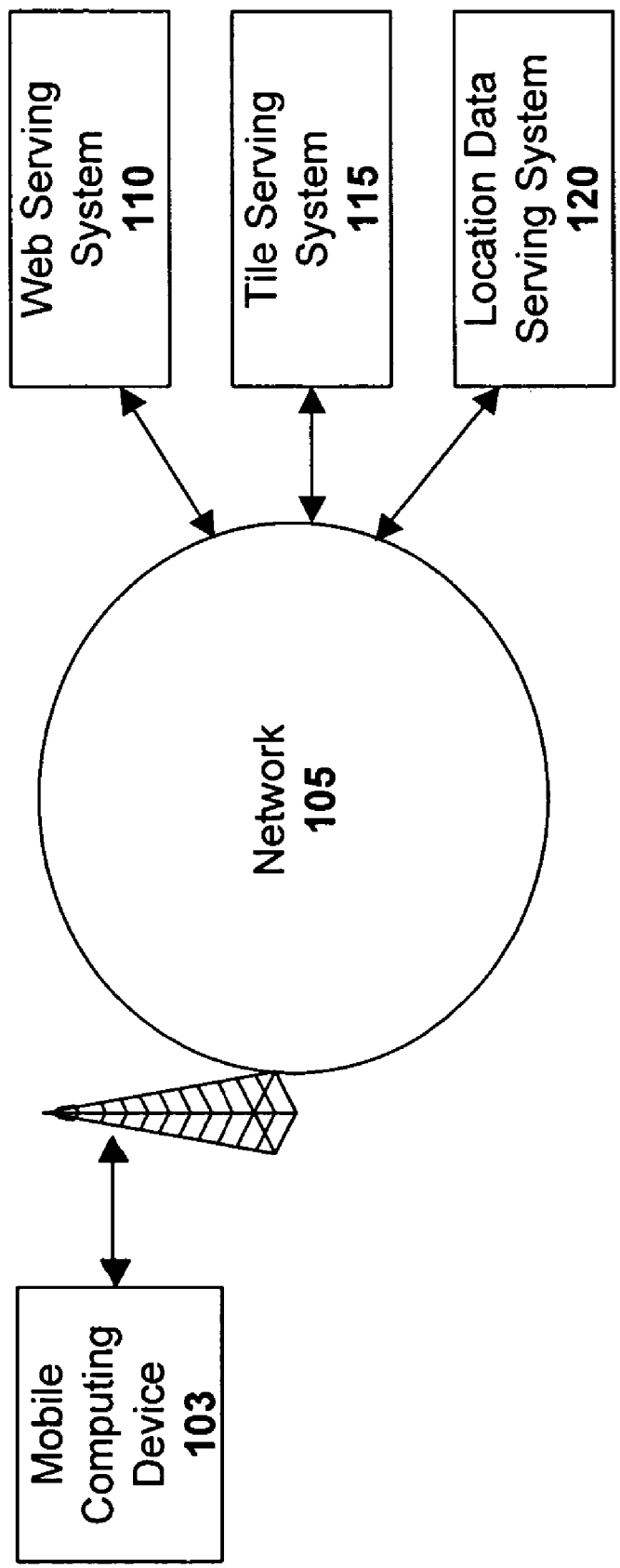
FIG. 1a is a block diagram of a digital mapping system configured to provide tile-based maps to mobile devices, in accordance with one embodiment of the present invention.

Techniques are disclosed that enable users to access and use digital mapping systems with constrained-resource services and/or mobile devices (e.g., cell phones and PDAS). In particular, latency of a mapping application on high-latency and low-throughput networks is minimized. One example embodiment of the technique utilizes volatile and non-volatile storage of the mobile device to cache pre-computed map images (e.g., map tiles). An asynchronous cache can be used to prevent delays caused by potentially slow non-volatile storage. Meta-data about each map image and usage patterns can be stored and used by the cache to optimize hit rates.

General Overview

As previously explained, current wireless networks are both slow and suffer from high-latency. Thus, reducing latency equates to improving user experience, as users will not tolerate long delays in viewing maps. With this in mind, note that a user will often view the same map areas, and that caching of the map data locally at the mobile device will operate to reduce network usage and reduce latency. However, cell phones, personal digital assistants, and other such mobile devices (e.g., smart phones that combine cell phone functionality with PDA functionality) are far from an ideal platform for persistent caching of data in conjunction with fast access times, and accomplishing the same is not trivial.

Using a tiled-map approach as described in the previously incorporated U.S. application Ser. Nos. 11/088,542 and 11/051,534 is one way to enable such persistent and relatively fast caching. In particular, each tile is an independent element that can be cached separately. Drawing a map requires multiple map tiles. Some tiles may be cached locally, and those that are not available in the cache can be downloaded from the network. While waiting for the downloaded tiles, a partially complete map can be displayed. When the user pans the map, additional tiles can be downloaded (or retrieved from cache) as needed. This is much more efficient than pulling down an entire screen-full of map data (such as a bitmap image) for each movement of the map, as is done with conventional mapping systems.

In one particular implementation of the present invention, two caches of the mobile device are used. One cache is stored in heap memory of the device, and the other cache is stored in flash memory of the device. In operation, a user engages a tile-based mapping system, and requests a map (e.g., for a particular location or driving directions). A map drawing application running on the mobile device identifies which map tiles are required to draw the map. For each required map tile, the application first attempts to find the tile in the heap cache, and then in the flash cache. If a target map tile is in the flash cache, it is loaded from the flash cache and placed in the heap cache. The heap cache serves as a buffer limiting the number of reads and writes to the flash cache. Required map tiles that are not found in either cache are queued for download via the network. Queued tiles can be requested for download asynchronously once all the missing tiles have been identified. When requested map tiles are downloaded from the server of the digital mapping system, they are placed in the heap cache. A background process copies the most cacheable tiles (e.g., based on a selective caching algorithm) into the flash cache.

In addition, the application can be configured with a no download mode, where missing tiles are not downloaded. This feature is useful for animated and transient maps, where heuristics indicate that there is a high likelihood that the map will not continue to be displayed long enough for the downloaded tiles to arrive. In this sense, the need for the subject tiles is fleeting. Numerous other variations and techniques for reducing network latency associated with map data delivery will be apparent in light of this disclosure.

System Architecture

FIG. 1a is a block diagram of a digital mapping system configured to provide tile-based maps to mobile devices, in accordance with one embodiment of the present invention. As can be seen, the system includes a mobile computing device 103 wirelessly connected to a network 105. Various serving systems are also communicatively coupled to the network 105, including a web serving system 110, a tile serving system 115, and a location data serving system 120. Other mobile computing devices 103 (not shown) may also be in communication with the serving systems 110, 115, and 120 via the network 105.

The mobile computing device 103 may be any type of mobile device configured for wireless computing, such as a mobile phone, a personal digital assistant, a navigation system located in a vehicle, a handheld GPS system, a laptop configured with mobile cell phone technology, and so on. The mobile computing device 103 includes a browser (or other similar application) that allows the user to interface and communicate with other devices and systems on the network 105. One example browser is the OpenWave browser (a common browser on cell phones). Other example browsers include Microsoft's Internet Explorer browser, Netscape's Navigator browser, Mozilla's Firefox browser, PalmSource's Web Browser, or any other browsing or application software capable of communicating with network 105. Generally stated, the mobile computing device 103 can be any device that allows a user to access the serving systems 110, 115, and 120 via the network 105.

The embodiment shown in FIG. 1a illustrates three separate backend systems (serving systems 110, 115, and 120) in direct communication with the mobile computing device 103. Alternative embodiments may include a central server that is in direct communication with the mobile computing device 103. This central server can then communicate with the various necessary backend servers (such as serving systems 110, 115, and 120). Other digital mapping system configurations will be apparent in light of this disclosure, and the present invention is not intended to be limited to any one such embodiment.

The web serving system 110 is the part of an overall system that delivers the initial HTML (hypertext markup language), images, scripting language (e.g., JavaScript, JScript, Visual Basic Script), XSLT (extensible stylesheet language transformation), and other static elements that are used by the browser on mobile computing device 103. Note that this serving system 110 may include one or more servers operating under a load balancing scheme, with each server (or a combination of servers) configured to respond to and interact with the mobile computing device 103. The web serving system 110 can be implemented with conventional or custom technology, as will be apparent in light of this disclosure.

The tile serving system 115 is the part of the overall system responsible for delivering individual map tiles in response to requests from the mobile computing device 103, with each tile being uniquely defined, for example, by x, y and z values that coordinates to an overall tile-based map. Other tile identification schemes can be used as well. The tile serving system 115 may include one or more servers operating under a load balancing scheme, with each server (or a combination of servers) configured to respond to and interact with the mobile computing device 103. Example architecture and functionality of the tile serving system 115 is further discussed, for example, in the previously incorporated U.S. application Ser. No. 11/088,542.

The location data serving system 120 is the part of the overall system that delivers location data of various forms to the mobile computing device 103. Its functions include, for example, finding the geographic location of a street address, generating and formatting driving directions, and searching for location-specific results to a query (e.g., as with the Google Local Search service). Other services may also be provided. In general, when the user enters a search string, it is put into a request by the mobile computing device 103, and sent to the location data serving system 120 via the network 105. The location data serving system 120 then determines what the request is for (e.g., generate driving directions and/or map), and responds with the appropriate data from various sub-systems, such as geo-coders, routing engines, and local search indexes or databases, in a format that mobile computing device 103 can use to present the data to the user (e.g., via a browser). Example architecture and functionality of the location data serving system 120 is further discussed, for example, in the previously incorporated U.S. application Ser. No. 11/088,542.

The network 105 may be any type of mobile communications network, such as a cellular or satellite network, or other such mobile networks that are constrained by relatively slow data rates and high-latency. Note that the network 105 may also include wired portions of one or more wide area networks (e.g., Internet and telephone company backbone). In general, the network 105 can be implemented with any number of conventional or custom technologies, and can employ numerous communication protocols and transmission techniques (e.g., TDMA, CDMA, TCP/IP), and inter-network interfaces (e.g., cellular-to-Internet network interface), as needed to allow for desired communication.

Figure 1B:
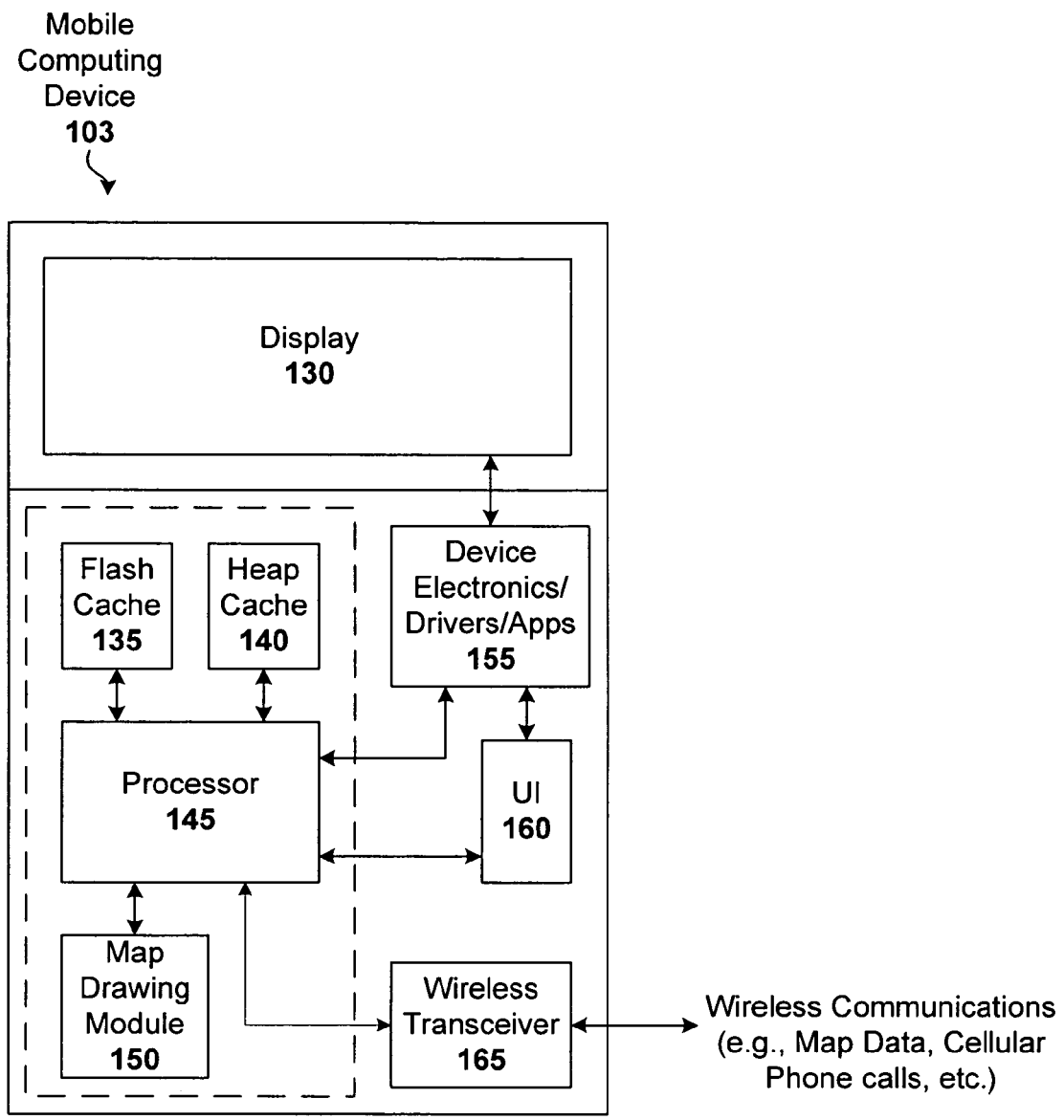
FIG. 1b is a block diagram of the mobile computing device of FIG. 1a, configured in accordance with one embodiment of the present invention.

FIG. 1b is a block diagram of the mobile computing device 103 of FIG. 1a, configured in accordance with one embodiment of the present invention. As previously explained, the device 103 can be any type of mobile device configured for wireless communication, such as a mobile phone or personal digital assistant, that is associated with a wireless service network that is constrained by relatively slow data rates and high-latency, thereby inhibiting performance of conventional digital map applications that download an entire screen-full of map data.

In this example configuration, mobile device 103 includes a display 130, a flash cache 135, a heap cache 140, a processor 145, a map drawing module 150, device electronics/drivers/applications 155, a user interface (UI) 160, and a wireless transceiver 165. Other components and features not shown may be included, and the actual configuration of the device 103 will vary from application to application, as will be apparent in light of this disclosure. Likewise, some illustrated features may not be included in other embodiments. The present invention is not intended to be limited to any one particular configuration.

Generally, each of the illustrated components, except for the map drawing module 150, can be implemented with conventional or custom technology and as commonly done in typical mobile devices. As is known, the flash cache 135 is a non-volatile memory, and the heap cache 140 is volatile memory that can be dynamically allocated or de-allocated by the processor 145, at any point during device operation. The map drawing module 150 can be implemented, for example, as a set of coded instructions (i.e., software application). These instructions can be downloaded to device 103 and stored into a non-volatile memory (e.g., flash cache 135 or ROM), and then loaded into a work space (e.g., RAM) for execution by the processor 145. The map drawing module 150 will be discussed in more detail with reference to FIGS. 4-6.

Note that numerous processing and memory schemes can be employed by the device 103. For instance, the flash cache 135 and/or heap cache 140 can be integrated (or allocated) into the processor 145. Likewise, the memory in which the map drawing module 150 is stored and/or the memory from which module 150 executes can be integrated into the processor 145. Further note that the processor 145 can be any one of a number of processing environments, such as a high speed microprocessor or microcontroller with various on-board memories and functionality, as is typically used in mobile devices. The dashed line around the flash cache 135, heap cache 140, processor 145, and map drawing module 150 is intended to embrace all such schemes, whether conventional or customized.

The device electronics/drivers/applications 155 includes typical circuitry (e.g., bus architecture, A/D and D/A conversion, antenna, keyboard, microphone, speaker, battery, etc), drivers (e.g., display driver), and applications (e.g., web browser, email, etc) that are commonly used in mobile devices. The display 130 can be, for instance, liquid crystal display (LCD). The UI 160 allows the user to interact with the device 130, and may be implemented, for example, using conventional keypad interfaces, as well as touch screen and stylus interfaces. The wireless transceiver 165 enables the device 103 to send and receive wireless communications, and can be configured to implement various protocols and modulation schemes (e.g., TDMA, GSM, and CDMA), all of which are constrained as described herein.

Tile-Based Map Data

As previously explained, using a tiled-map approach as described in the previously incorporated U.S. application Ser. Nos. 11/088,542 and 11/051,534 enables relatively fast, persistent caching.

In addition, using uniform tiles improves the appearance and enhances the cacheability of the map data. In one such embodiment, the optimum tile-size is determined by determining the empirical image-size/compression curve and then using discrete algebra to plot the screen-size/tile-size efficiency curve. Image data can be transmitted, for instance, using the PNG image format. This format compresses the image data using the LZW compression library. Other image formats can be used as well, such as JPEG and GIF. In any case, larger images compress better and have less overhead than smaller images. For instance, sending four 20×20 pixel images takes substantially more bandwidth than sending one 40×40 pixel image with the exact same data.

Figure 2:
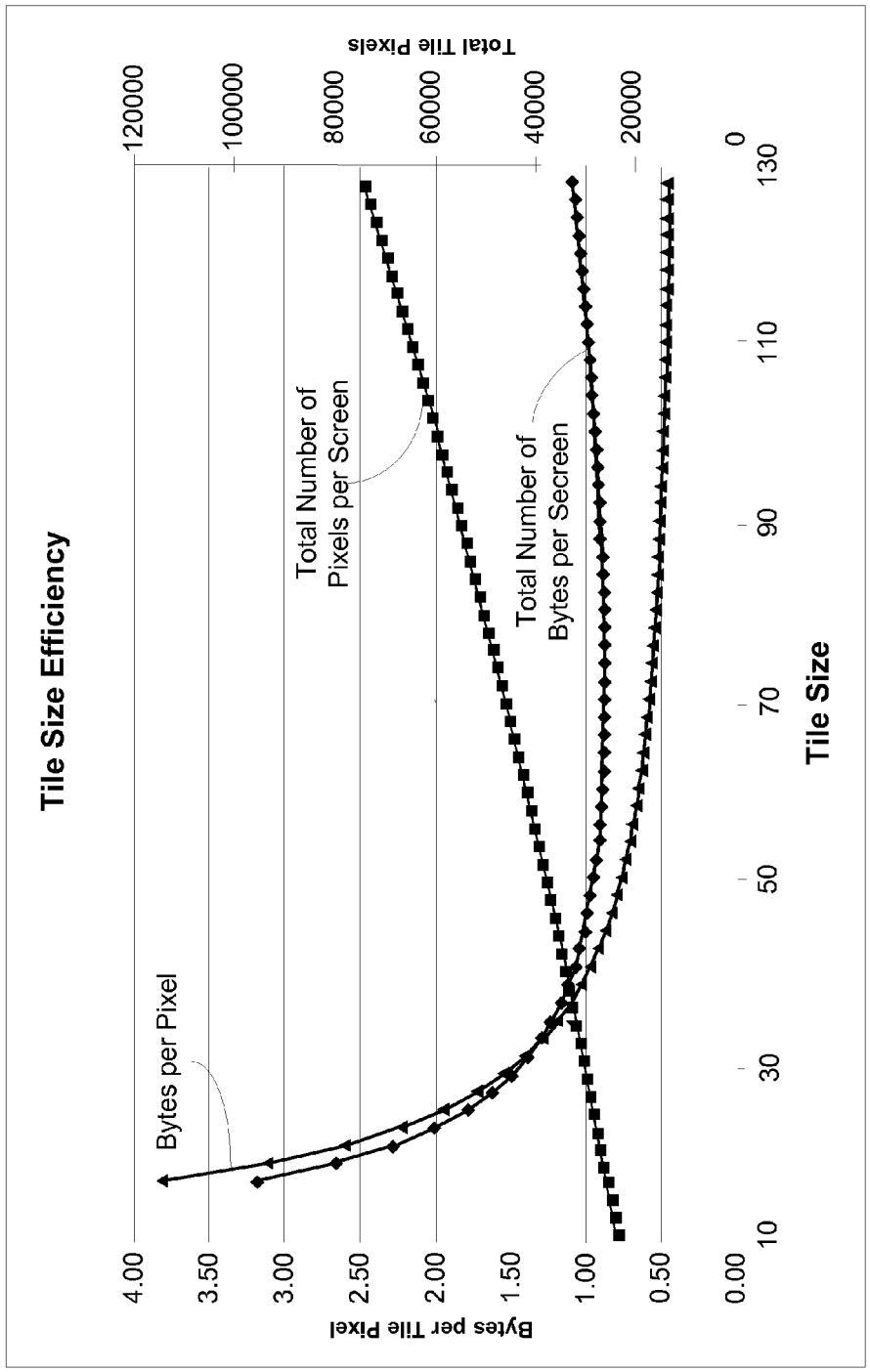
FIG. 2 demonstrates tile-size efficiency for a given screen size of a mobile device, in accordance with an embodiment of the present invention.

FIG. 2 demonstrates tile-size efficiency for a given screen size of a mobile device, in accordance with an embodiment of the present invention. As can be seen, there are three data plots. The plot labeled "total number of pixels per screen" shows the total number of pixels required (on average) to fill a screen that is about 160×128 pixels in dimension, using tiles of different sizes. This dimension of 160×128 pixels is an estimate to represent the average screen size of a typical mobile device. This is a purely algebraic calculation. The plot labeled "bytes per pixel" shows the efficiency of the different tile sizes. This is empirical data based on the image encoder used on particular set of map tiles. The curve is largely dependent on the exact map images and the encoder used. The plot labeled "total number of bytes per screen" represents the two other plots multiplied together, which shows how many bytes will be required on average to fill a screen. Minimizing this number of bytes is desirable to reduce use of the constrained resources servicing the mobile device. In this example, a tile size of about 70×70 pixels is ideal for providing the lowest number of bytes per screen. Thus, in one particular embodiment, tiles of 64×64 ($2^6$) pixels are used. The difference in efficiency between a tile size of the ideal 70×70 and the more convenient (from an implementation standpoint) 64×64 is negligible. Other tile sizes will be apparent in light of this disclosure (e.g., 32 to 128 pixels square). Also, the tiles can be other shapes instead of square, such as rectangular. For instance, use of rectangular tiles on a rectangular display may actually provide slightly better efficiency, but non-square tiles tend to increase implementation costs. Thus, the shape of the map tiles will depend on a cost-benefit analysis of factors such as desired efficiency and overall implementation costs. For many applications, the efficiency gain provided by rectangular tiles may not warrant the increased implementation cost.

Figure 3A:
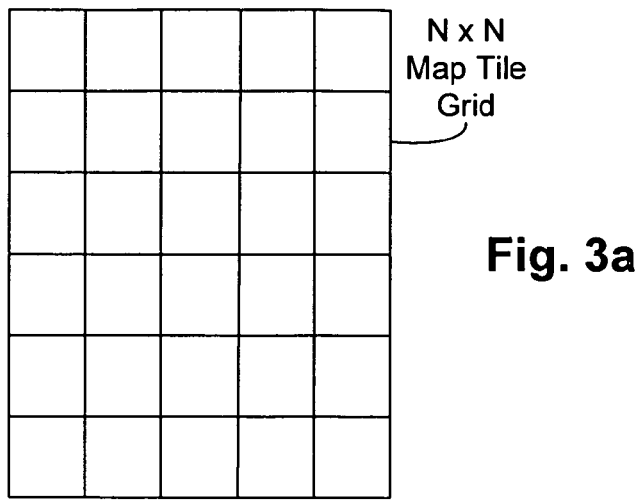
FIGS. 3a-c illustrate the relationship between an N×N map tile grid, a map display screen, and the tiles used to draw the map, in accordance with an embodiment of the present invention.
Figure 3B:
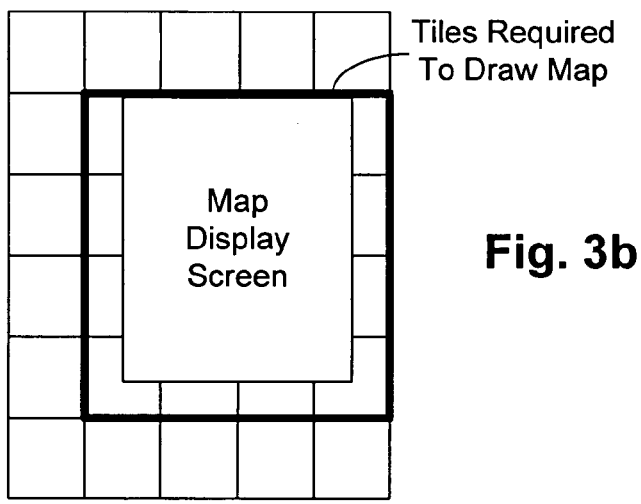
Figure 3C:
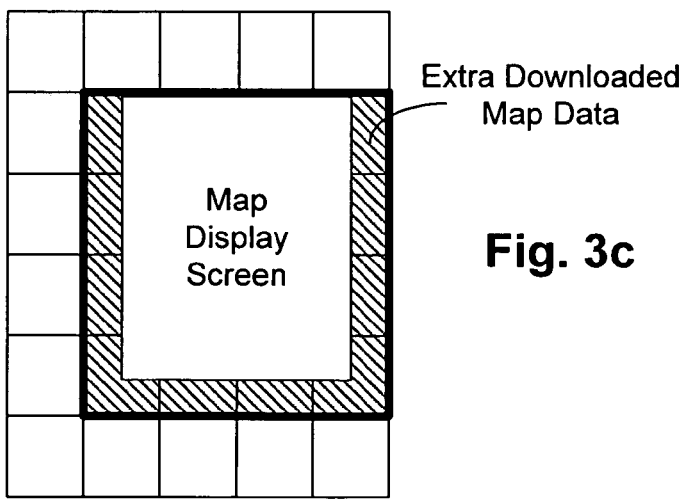

The screen-size/tile-size efficiency curve reflects the inefficiency of using fixed-grid tiles. For a given display screen size, a variable number of tiles will need to be downloaded, depending on the screen-to-grid alignment. Unless the screen is an even multiple of the tile-size and is aligned perfectly, there will also be "extra" tile data downloaded that is not displayed. FIGS. 3a-c illustrate this problem, and show an example N×N map tile grid, a map display screen, the tiles required to draw a map on that screen, and the extra downloaded map data. As an example, consider a screen that is 20×20 pixels, and a tile size of 11 pixels square. The average number of tiles that will need to be downloaded can be calculated to completely cover the screen. Note that this is a statistical average over all possible screen/tile alignments. Different alignments require different numbers of tiles.

In the degenerate case using tiles that are one pixel square, there is no "extra" tile data. However, such small tiles are extremely inefficient from a compression and overhead standpoint. In one specific embodiment, and as previously discussed with reference to FIG. 2, a tile size of about 64 pixels per side is optimal, given the typical range of mobile display sizes.

Methodology

Figure 4:
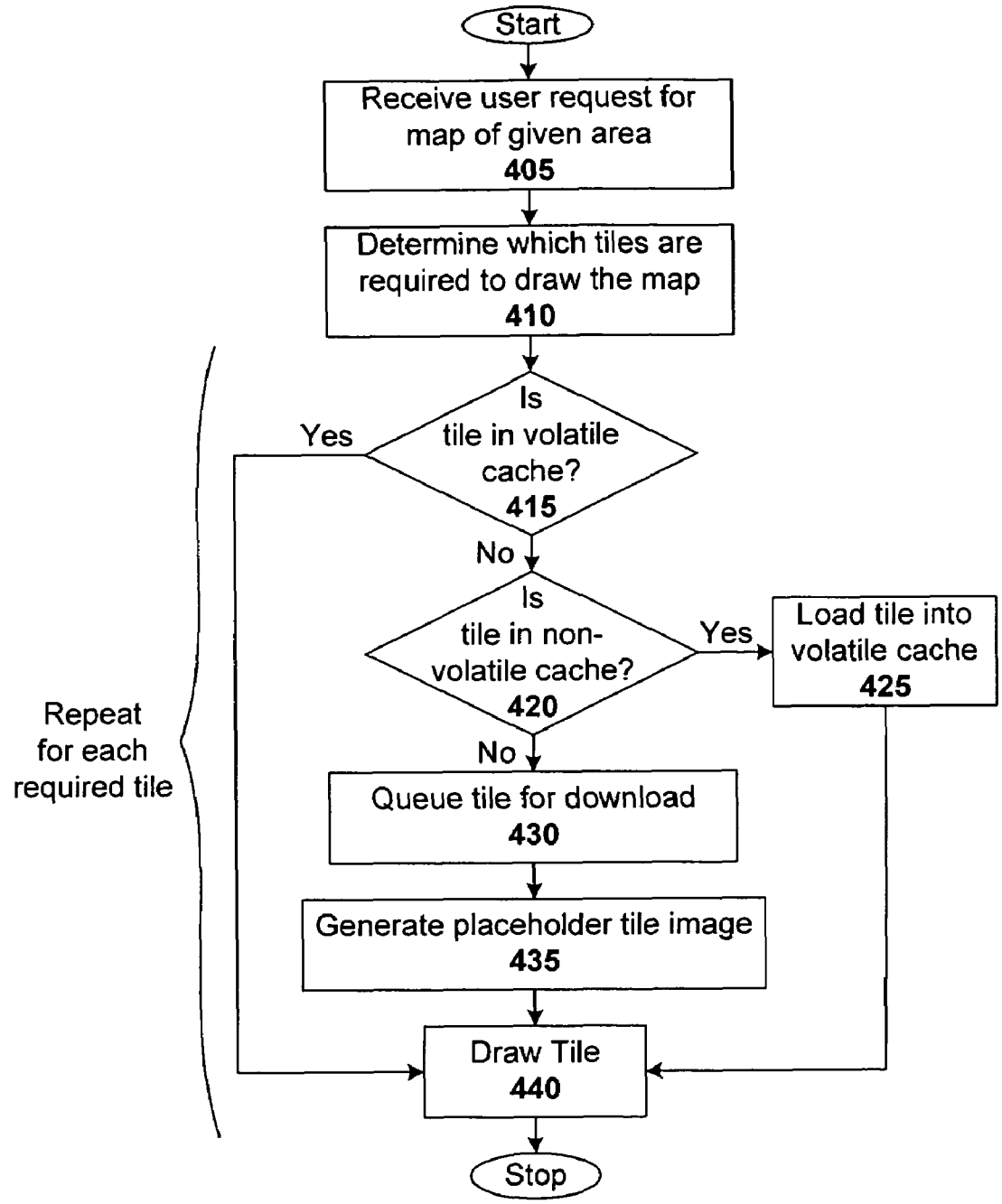
FIG. 4 illustrates a method for providing a tile-based map on a mobile device, in accordance with an embodiment of the present invention.

FIG. 4 illustrates a method for providing a tile-based map on a mobile device, in accordance with an embodiment of the present invention. This method can be implemented, for example, by the map drawing module 150 of the mobile device shown in FIG. 1b. This particular embodiment assumes that the mobile device is communicatively coupled (e.g., via a communications network) to a tile-based mapping system, as discussed with reference to FIG. 1a. The mobile device can be, for instance, a cell phone or personal digital assistant.

The method includes receiving 405 a user request for a map of a given area, and determining 410 which map tiles of the tile-based mapping system are required to draw the requested map. The remainder of the method is repeated for each required tile. The process can be carried out, for example, either serially (one tile at a time), or in parallel (where each of the required tiles are simultaneously subjected to the process).

In either case, the method includes (for each tile) determining 415 if the map tile is in volatile cache (e.g., heap cache of mobile device). If so, then the method continues with drawing 440 the map tile for display to the mobile device. Conventional or custom drawing techniques can be used to draw the map tiles.

If the map tile is not in volatile cache, then the method continues with determining if the tile is in non-volatile cache (e.g., flash cache of mobile device). If so, then the method continues with loading 425 the tile into volatile cache, and then drawing 440 the tile for display on the mobile device. Note that cell phones are typically equipped with relatively large amounts (e.g., 1 MB+) of flash memory. Typically, this flash memory is slow to write (e.g., 5-10 KB/s) but fast to read from (e.g., +100 KB/s). The flash memory is also non-volatile, in that it retains data after application shutdown and power down as well. The volatile heap cache is fast to both read and write (e.g., +100 KB/s). The heap cache serves as a buffer that limits the number of reads and writes to the flash cache.

If the tile is not in non-volatile cache, then the method continues with queuing 430 the tile for download from the remote tile server of the mapping system with which the mobile device is communicatively coupled, generating 435 a placeholder tile image, and drawing 440 the map tile. In one particular embodiment, queued tiles are requested for download asynchronously once all the missing tiles have been identified. In one embodiment, the method also has a no-download mode, where missing tiles are not downloaded. This mode is useful, for instance, for animated and transient maps, where heuristics indicate there is a high likelihood that the map will not continue to be displayed long enough for the downloaded tiles to arrive. Note that some network API's do not provide a way of canceling pending requests, and once a request for tile map data is made, that request will continue to completion even if the data is no longer required. Such unnecessary downloads use bandwidth that is already limited, as previously explained. Thus, the no-download mode feature is helpful to avoid unnecessary downloads.

The heuristics used to trigger the no-download mode can be based, for example, on the user's previous mapping habits. For instance, if the user consistently maintains a pan in one direction (e.g., by clicking and holding the pan left button), then a "hard pan" is occurring, where intermediate map tiles need not be downloaded. Then, when the user switches to a "soft pan" (e.g., back-to-back clicking of the pan left button), then the no-download mode can be turned off, so that map tiles of the current view will be downloaded. Note that cached tiles can still be drawn during the no-download mode, if so desired. Numerous heuristics can be used here to trigger the no-download mode, as will be apparent in light of this disclosure.

In one particular embodiment, the method is configured so that it never blocks for a user-perceivable time period. That is, each map drawing finishes quickly. The flash cache is designed so that tiles can be loaded quickly (e.g., <100 ms). In one such configuration, the flash cache maintains an index kept in volatile memory. The index can be queried to quickly determine if a tile is present, and if it is, where in the flash cache it is stored. This index is also stored in flash memory as well, and at startup-time, the index is read from that flash. The flash cache may also maintain a queryable locking state. On some platforms, loading tiles from flash is not permitted while simultaneously writing tiles. Since writing operations may take a long time, this would result in a noticeable delay in map drawing. To prevent this, the client application (e.g., map drawing module 150) may be configured to check the state of the flash cache before requesting a tile load. If the flash cache is busy, a temporary image can be used in place of the requested map tile, as will now be explained.

Missing tiles are downloaded in a background thread that operates contemporaneously with accessing of the caches. While the tiles are downloading, a temporary map tile image (e.g., stored locally on mobile device) can be displayed. This image can be, for example, an animated "please wait" or similar image, or a low-resolution map image derived from a lower-level zoom. For instance, if the user zooms in on a spot, the flash and heap caches should already contain the map area being drawn, but at a lower zoom level (i.e., the broader view prior to zooming in). A low-resolution image can be derived by magnifying the lower zoom level tiles and clipping the tile to get the appropriate area. These images serve as a reasonable temporary approximation of the real map tiles.

Flash Cache Maintenance

Figure 5:
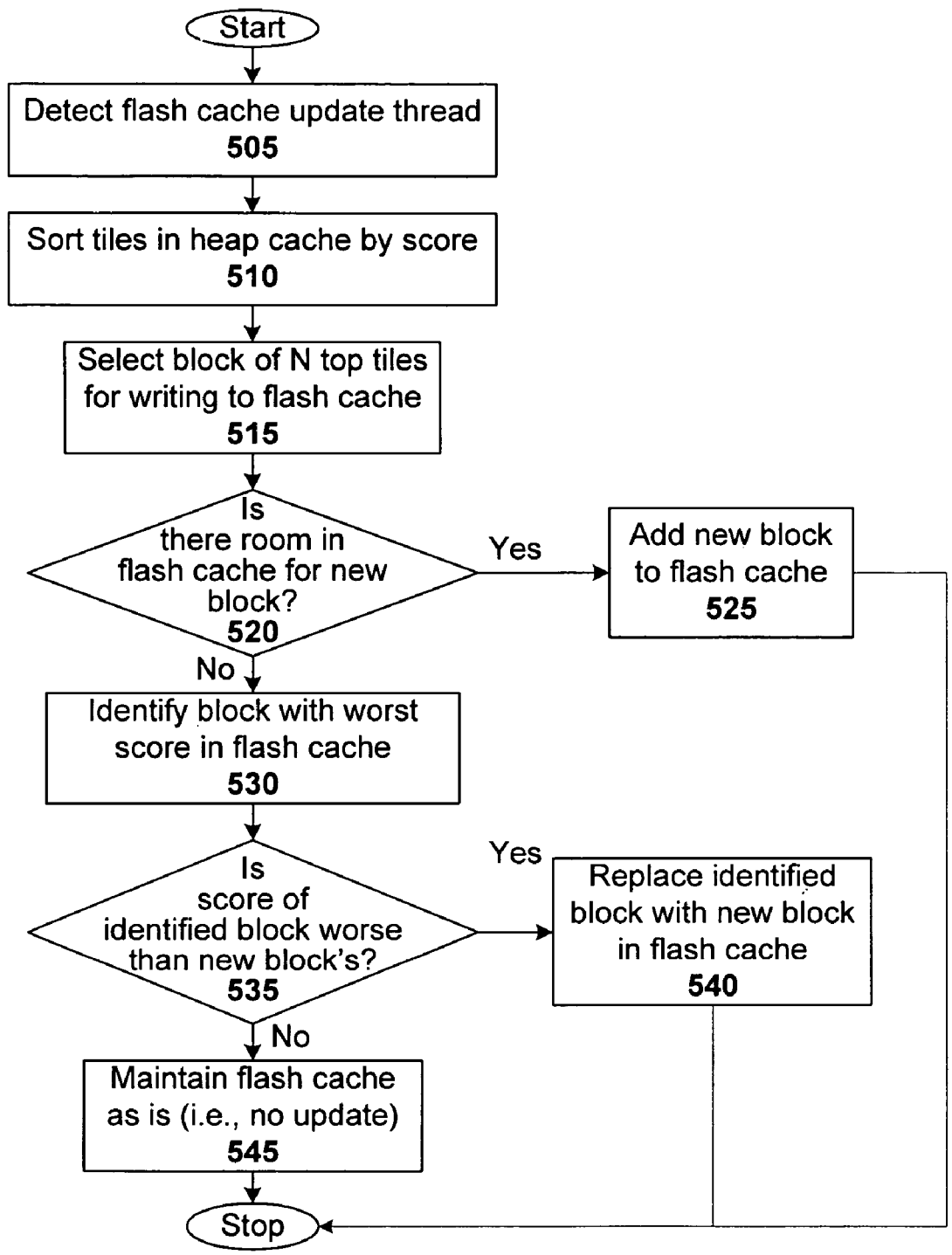
FIG. 5 illustrates a method for maintaining a flash cache, in accordance with an embodiment of the present invention.

FIG. 5 illustrates a method for maintaining a flash cache, in accordance with an embodiment of the present invention. Just as with the method of FIG. 4, this method can be implemented by the map drawing module 150 of the mobile device shown in FIG. 1b, and previous discussion as to example mobile devices and mapping systems are equally applicable here. In this embodiment, the flash cache is maintained by an asynchronous process that carries out both insertion and removal of map tiles from the flash cache.

As will be discussed, flash cache data is stored in blocks in this embodiment. Each block contains image data for one or more tiles. When new tiles are added to the flash cache, they are added and removed in blocks. Each block is configured to be at least a certain number of bytes in size. In one particular embodiment, the blocks correspond to J2ME records in a RecordStore. In addition to this data, the flash cache also maintains a catalog that includes meta-data about each map image and usage patterns. The catalog contains a hash table (or other indexing scheme) that maps each tile in the flash cache to the block in which it is stored. Once the block is identified, its contents are read and the tile image data is extracted from that block. Because a block can contain multiple tiles, there can be multiple tile keys in the hash table mapping to the same block. The catalog data can also be written to the flash cache. At startup, only the catalog data need be read. From this indexed data, all the map tiles stored in the flash cache can be quickly located as needed, without having to scan the entire flash memory.

The method includes detecting 505 a flash cache update thread (or the flash cache update thread otherwise wakes up), and sorting 510 map tiles in the heap cache by their respective scores. The scoring process will be explained in turn. The method continues with selecting 515 a block of N top score tiles for writing to the flash cache. For instance, starting with the best scoring, tiles are picked sequentially for caching, ignoring tiles already present in the flash cache. Tiles are selected until the combined size of all tiles is larger than a pre-defined block size. The block size can be tuned for the particular hardware. In one particular embodiment, a value near 5000 bytes is used. Assuming that map tiles are about 1500-2000 bytes each, implies that each block contains about 3-4 tiles on average.

The method then continues with determining 520 if there is room in the flash cache for the new block. If so, the method includes adding 525 map tiles of the new block to the flash cache (and updating the flash cache catalog accordingly). If there is no room in the flash cache for the new block, then the method continues with identifying 530 the block with the worst score in the flash cache, and then determining 535 if the score of the identified block is worse (e.g., lower) than the new block's score. If so, then the method continues with replacing the identified block with the new block in the flash cache. On the other hand, if the score of the identified block is not worse, then the method continues with maintaining 545 the flash cache as is (i.e., no update). A block score is also calculated for each new block, as well as for blocks in the flash cache. The block score can be, for example, the score of each map tile in the block averaged together. Note that if no free space is available in the flash cache, then the new block can replace one or more existing blocks. Thus, the operation can be repeated until enough space exists to write the new block. Once space exists, the new block is written to the flash cache and an entry is added to the flash catalog.

Heap Cache Maintenance

Figure 6:
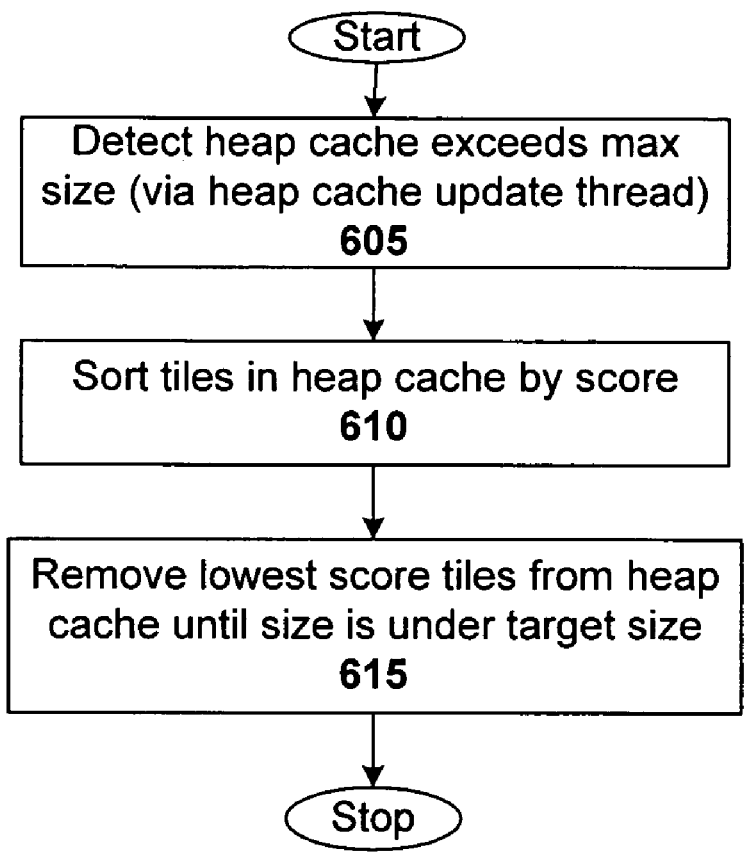
FIG. 6 illustrates a method for populating a heap cache, in accordance with an embodiment of the present invention.

FIG. 6 illustrates a method for populating a heap cache, in accordance with an embodiment of the present invention. Just as with the method of FIG. 4, this method can be implemented by the map drawing module 150 of the mobile device shown in FIG. 1*b*, and previous discussion as to example mobile devices and mapping systems are equally applicable here. In this embodiment, the heap cache is also maintained by an asynchronous process.

The method includes detecting 605 that the heap cache exceeds its maximum size (e.g., via heap cache update thread). In one particular embodiment, the maximum size of the heap cache is measured not by the number of entries (as is typical), but rather by the combined size of each entry, since map tiles can vary widely in their size. The method continues with sorting 610 the map tiles in the heap cache by their respective scores, and then removing 615 the lowest score tiles from the heap cache, until its size is under the target maximum size by a sufficient amount. In one such case, the sufficient amount is at least the size of one or more tiles. Otherwise, every time one more tile was added, the heap cache would exceed the maximum size again.

Tile Scoring

A number of scoring algorithms can be used to determine which tiles are kept in the flash and heap caches. One embodiment of the present invention uses domain specific knowledge to improve the scoring function. In more detail, the scoring algorithm calculates a score for each tile based on that tile's last access time, tile zoom level, and/or the user's access pattern. The zoom level affects the expected reuse of the tile. Higher zoom tiles cover less area and are thus less likely to be re-used. Waypoints stored by the user can also contribute to the scoring. For instance, map tiles near or containing waypoints commonly used by the user (such as a home or work place) can be preferentially cached.

In another embodiment, the scoring functions for the flash and heap are slightly different. While the flash cache tile scoring is as described above, the heap cache tile scoring can have its emphasis placed on recently used tiles. In one particular case, the heap cache should never discard a tile that is currently displayed. In another particular case, the heap cache should never discard a tile that is currently displayed, or about to be displayed, or just previously displayed. Variation on this recently used tile scoring scheme can be used in conjunction with predictive caching that is based on past user behavior and other heuristics.

A number of alternative embodiments can be implemented as will be apparent in light of this disclosure. For example, newer mobile devices with faster flash cache may not require the asynchronous flash store. In addition, mobile devices with large amounts of storage may be able to store every tile as it arrives and only infrequently purge old, unused tiles.

A more accurate method for scoring tiles involves keeping detailed logs of map tile usage on a per client basis. From these logs, the most frequently used tiles would be saved. However, keeping such detailed information may not be practical on the current generation of phones. Storing the information itself could possibly take as much space as the image data. Thus, a server-based implementation can be used, where the logged user data is uploaded (e.g., automatically or at user's request) and stored on the server side of the overall mapping system. In one such embodiment, the server would track each client's usage pattern, and automatically send "likely to be used" tiles (in addition to requested tiles). Alternatively, the client could ask the server for a caching recommendation as to the best tiles (based on the server's log data) to add to the flash cache.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for providing a tile-based map on a mobile device that is communicatively coupled to a tile-based mapping system, the method comprising:
   determining which map tiles of the tile-based mapping system are required to draw a requested map;
   in response to a required map tile being stored in a heap cache of the mobile device, drawing that map tile for display on the mobile device;
   in response to a required map tile being stored in a flash cache of the mobile device, loading that map tile into the heap cache; and
   in response to a required map tile not being stored in the flash cache or the heap cache, queuing the tile for download from a remote tile server of the tile-based mapping system.

2. The method of claim 1 wherein the mobile device is a cell phone or a personal digital assistant or a combination of the two.

3. The method of claim 1 wherein in response to a required map tile being stored in a flash cache of the mobile device, the method further includes drawing the map tile for display on the mobile device after it is loaded into the heap cache.

4. The method of claim 1 wherein in response to a required map tile not being stored in the flash cache or the heap cache, the method further includes generating a placeholder tile image for tile queue for download.

5. The method of claim 1 wherein in response to a required map tile not being stored in the flash cache or the heap cache, the method further includes drawing the map tile for display on the mobile device after it is downloaded.

6. The method of claim 1 wherein queued map tiles are requested for download asynchronously once all missing tiles have been identified.

7. The method of claim 1 wherein at least one missing tile is not downloaded based on heuristics indicating there is a high likelihood that need for the at least one missing tile is fleeting.

8. The method of claim 1 wherein missing map tiles are downloaded in a background thread that operates contemporaneously with accessing of the caches.

9. The method of claim 1 wherein while missing tiles are downloading, a temporary map tile image is displayed for at least one of the missing tiles.

10. The method of claim 9 wherein the temporary image is a low-resolution map image derived from a lower-level zoom.

11. The method of claim 1 wherein the flash cache is maintained by an asynchronous process that carries out both insertion and removal of map tiles from the flash cache, including:
   sorting map tiles in the heap cache based on respective scores;
   selecting a new block of N top score map tiles for writing to the flash cache; and
   in response to there being room in the flash cache for the new block, adding map tiles of the new block to the flash cache.

12. The method of claim 11 wherein in response to there being insufficient room in the flash cache for the new block, the method further comprising:
   identifying a lowest score block in the flash cache; and
   in response to the score of the identified block being worse than a score of the new block, replacing the identified block with the new block in the flash cache.

13. The method of claim 12 wherein in response to the score of the identified block not being worse than the score of the new block, maintaining the flash cache as is.

14. The method of claim 1 wherein the heap cache is maintained by an asynchronous process, comprising:
   detecting that the heap cache exceeds its maximum size;
   sorting the map tiles in the heap cache based on respective scores; and
   removing lowest score map tiles from the heap cache, until its size is under the maximum size.

15. The method of claim 1 further comprising:
   calculating a score for each map tile stored in the caches based on last access time of tile.

16. The method of claim 1 further comprising: calculating a score for each map tile stored in the caches based on at least one of tile zoom level and user access pattern of tile.

17. The method of claim 1 wherein each map tile is about 64 pixels per side.

18. A method for providing a tile-based map on a mobile device including at least one of a cell phone and a personal digital assistant, that is communicatively coupled to a tile-based mapping system, the method comprising:
   determining which map tiles of the tile-based mapping system are required to draw a requested map, each map tile having a size of about 64 pixels per side;
   in response to a required map tile being stored in a heap cache of the mobile device, drawing that map tile for display on the mobile device;
   in response to a required map tile being stored in a flash cache of the mobile device, loading that map tile into the heap cache and then drawing the map tile for display on the mobile device; and
   in response to a required map tile not being stored in the flash cache or the heap cache, at least one of queuing the tile for download from a remote tile server of the tile-based mapping system, generating a placeholder tile image for tile queue for download, and drawing the map tile for display on the mobile device after it is downloaded.

19. The method of claim 18 wherein at least one missing tile is not downloaded based on heuristics indicating there is a high likelihood that need for the at least one missing tile is fleeting.

20. The method of claim 18 further comprising:
   calculating a score for each map tile stored in the caches based on at least one of last access time of tile, tile zoom level, and user access pattern of tile; and
   maintaining the caches based on the scores.

21. A method for providing a tile-based map on a mobile device that is communicatively coupled to a tile-based mapping system, the method comprising:
   determining which map tiles of the tile-based mapping system are required to draw a requested map, each map tile having a size that reduces required data bytes per screen as compared to other map tile sizes;
   in response to a required map tile being stored in a volatile cache of the mobile device, drawing that map tile for display on the mobile device;
   in response to a required map tile being stored in a non-volatile cache of the mobile device, loading that map tile into the volatile cache; and
   in response to a required map tile not being stored in the mobile device, requesting the tile for download from the tile-based mapping system.

22. The method of claim 21 wherein the mobile device is a cell phone or a personal digital assistant or a combination of the two.

23. The method of claim 21 wherein at least one missing tile is not downloaded based on heuristics indicating there is a high likelihood that need for the at least one missing tile is fleeting.

24. The method of claim 21 wherein while missing tiles are downloading, a temporary map tile image is displayed for at least one of the missing tiles.

25. The method of claim 21 further comprising:
   calculating a score for each map tile stored in the mobile device based on at least one of last access time of tile, tile zoom level, and user access pattern of tile; and
   maintaining stored map tiles based on the scores.

26. The method of claim 21 wherein each map tile is about 32 to 128 pixels per side.

* * * * *